US009550654B2

(12) United States Patent
Bavafa

(10) Patent No.: US 9,550,654 B2
(45) Date of Patent: Jan. 24, 2017

(54) HELICAL ESCALATOR SYSTEM

(71) Applicant: Hossein Bavafa, Denton, TX (US)

(72) Inventor: Hossein Bavafa, Denton, TX (US)

( * ) Notice: Subject to any disclaimer, the term of this patent is extended or adjusted under 35 U.S.C. 154(b) by 0 days.

(21) Appl. No.: 14/745,192

(22) Filed: Jun. 19, 2015

(65) Prior Publication Data

US 2016/0368740 A1 Dec. 22, 2016

(51) Int. Cl.
*B65G 21/00* (2006.01)
*B65G 21/18* (2006.01)
*B66B 21/06* (2006.01)

(52) U.S. Cl.
CPC .................................... *B66B 21/06* (2013.01)

(58) Field of Classification Search
CPC ................................ B65G 21/18; B66B 21/00
USPC ........ 198/321, 325, 326, 328, 332, 333, 778
See application file for complete search history.

(56) References Cited

U.S. PATENT DOCUMENTS

| | | | | | |
|---|---|---|---|---|---|
| 723,325 | A | | 3/1903 | Souder | |
| 782,009 | A | * | 2/1905 | Dodge | B66B 21/06 198/321 |
| 792,623 | A | | 6/1905 | Souder | |
| 967,710 | A | * | 8/1910 | Bennett | B66B 21/06 198/323 |
| 3,878,931 | A | * | 4/1975 | Luna | B66B 21/06 198/328 |
| 4,434,884 | A | * | 3/1984 | Kettle | B65G 21/18 198/328 |
| 4,883,160 | A | * | 11/1989 | Sansevero | B66B 23/12 198/328 |
| 4,884,673 | A | * | 12/1989 | Rivera | B66B 21/06 198/328 |
| 4,895,239 | A | * | 1/1990 | Johnson | B66B 21/06 198/328 |
| 4,930,622 | A | * | 6/1990 | Sansevero | B66B 21/06 198/328 |
| 4,949,832 | A | * | 8/1990 | Sansevero | B66B 21/06 198/328 |
| 4,953,685 | A | * | 9/1990 | Johnson | B66B 21/06 198/328 |
| 5,050,721 | A | * | 9/1991 | Sansevero | B66B 21/06 198/328 |
| 5,052,539 | A | * | 10/1991 | Fillingsness | B66B 23/12 198/323 |
| 5,158,167 | A | * | 10/1992 | Pahl | B66B 21/06 198/328 |
| 5,165,513 | A | * | 11/1992 | Nakatani | B66B 21/06 198/324 |
| 5,213,191 | A | * | 5/1993 | Tahara | B66B 21/06 198/328 |

(Continued)

*Primary Examiner* — Douglas Hess
(74) *Attorney, Agent, or Firm* — Law Office of Jeff Williams; J. Oliver Williams

(57) ABSTRACT

The present application includes a system configured to provide transportation services between two different elevations. Individuals may be transported upward or downward within a circular stairway. The system includes a series of fixed stairs coupled to a housing. It also includes a series of corresponding movable stairs coupled to a central shaft. The movable stairs are configured to move in relation to the central shaft and are operable to provide transportation between two fixed stairs. An individual is lifted and translated between the fixed stairs as the movable stairs transition between a plurality of positions.

15 Claims, 5 Drawing Sheets

(56) References Cited

U.S. PATENT DOCUMENTS

| | | | | |
|---|---|---|---|---|
| 6,354,404 | B1 * | 3/2002 | Sansevero | B66B 9/02 187/249 |
| 6,899,216 | B2 * | 5/2005 | Levy | B66B 21/06 198/328 |
| 7,131,522 | B2 | 11/2006 | Sircovich | |
| 7,377,080 | B2 * | 5/2008 | Mills | B64D 11/00 182/106 |
| 2014/0069771 | A1 * | 3/2014 | Strieter et al. | |
| 2015/0068864 | A1 * | 3/2015 | Strieter | |

* cited by examiner

HELICAL ESCALATOR SYSTEM

BACKGROUND

1. Field of the Invention

The present application relates generally to an elevating device and, more particularly, to a helical escalator system to transport an individual between floors.

2. Description of Related Art

Stairs are the most common means for enabling an individual to climb to (or descend from) different levels in a residential, commercial, or other buildings. Stairs require effort to navigate and may even be unusable by some individuals. Advancements have been made to develop moveable stairs (i.e. escalators) and elevators. Elevators are costly and can take up a considerable amount of space. Additionally they have the disadvantage of being in operable in selected types of emergencies.

Escalators are useful to overcome the disadvantage of elevators during emergencies but also allow for most individuals to navigate and use it. The idea is to provide a series of steps that run in a linear path up and down between to different elevated levels. Such systems create a loop in that as stairs reach one end, they are sent to the other end and start the ascent or descent again. A disadvantage of traditional escalators is that they require considerable room to install. Linear space limitations make the use of an escalator less desirable.

Circular stairways have been developed to provide a more compact system however difficulties remain. Typical systems operate like traditional escalators in that a single a single stair is rotated around the length of the escalator in an ascending or descending fashion. Such systems also tend to require a loop for the stairs to run through. Some systems use tracks placed along the inside or outside of each step to permit the stair to roll up and down along its length. The need for the looping of each stair to return each stair to either end is a great limitation to circular stairways, and escalators in general.

Although great strides have been made, considerable shortcomings remain. A new type of escalator stairway system is needed to permit a non-looping escalator system that transports individuals between different elevations in a circular fashion.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
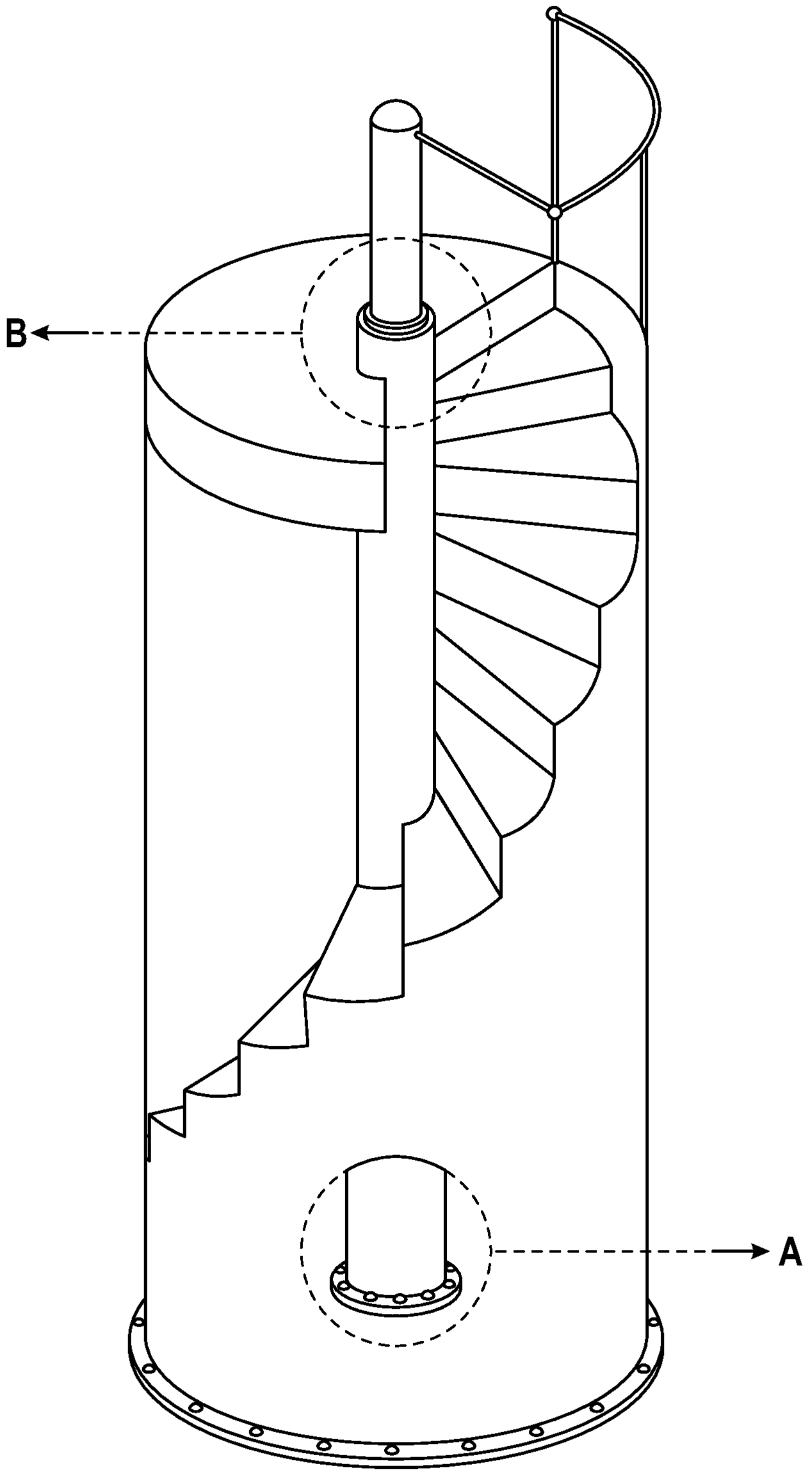
FIG. 1 is a perspective view of the escalator system according to the preferred embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The assembly in accordance with the present application overcomes one or more of the above-discussed problems commonly associated with conventional escalators and stair lift systems. Specifically, the system of the present application is configured to transport an individual between different elevations by utilizing a series of fixed stairs and movable stairs. The movable stairs are configured to move in relation to the fixed stairs and transport an individual between fixed stairs, one at a time. Each movable stair loops in relation to a single fixed stair. The individual is not required to take any additional steps or walk between stairs. These and other unique features of the assembly are discussed below and illustrated in the accompanying drawings.

The assembly and method will be understood, both as to its structure and operation, from the accompanying drawings, taken in conjunction with the accompanying description. Several embodiments of the assembly are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The escalator system of the present application is illustrated in the associated drawings. The assembly includes a central shaft surrounding a fixed shaft. The central shaft is configured to move in relation to the fixed shaft. A series of fixed stairs and movable stairs are selectively engaged between the central shaft and the outer housing of the escalator system. Fixed stairs are coupled directly to the outer housing in a cantilevered fashion. Movable stairs are coupled directly to the central shaft in a cantilevered fashion. The movable stairs move in relation to the fixed stairs in accordance to the movement of the central shaft. The movement is configured to transport an individual between the fixed stairs.

Referring now to the drawings wherein like reference characters identify corresponding or similar elements in form and function throughout the several views. FIG. 1 illustrates escalator system 101 in its basic form. System 101 includes a series of stairs 103 in communication between an outer housing 21 and a central shaft 107. Central shaft 107 is in active communication with a fixed shaft 109, such that central shaft is configured to move in relation to fixed shaft 109. Alternating members of stairs 103 are in selective communication with either housing 21 or central shaft 107. A more detailed description of the operation and function of stairs 103 are provided below.

Figure 2:
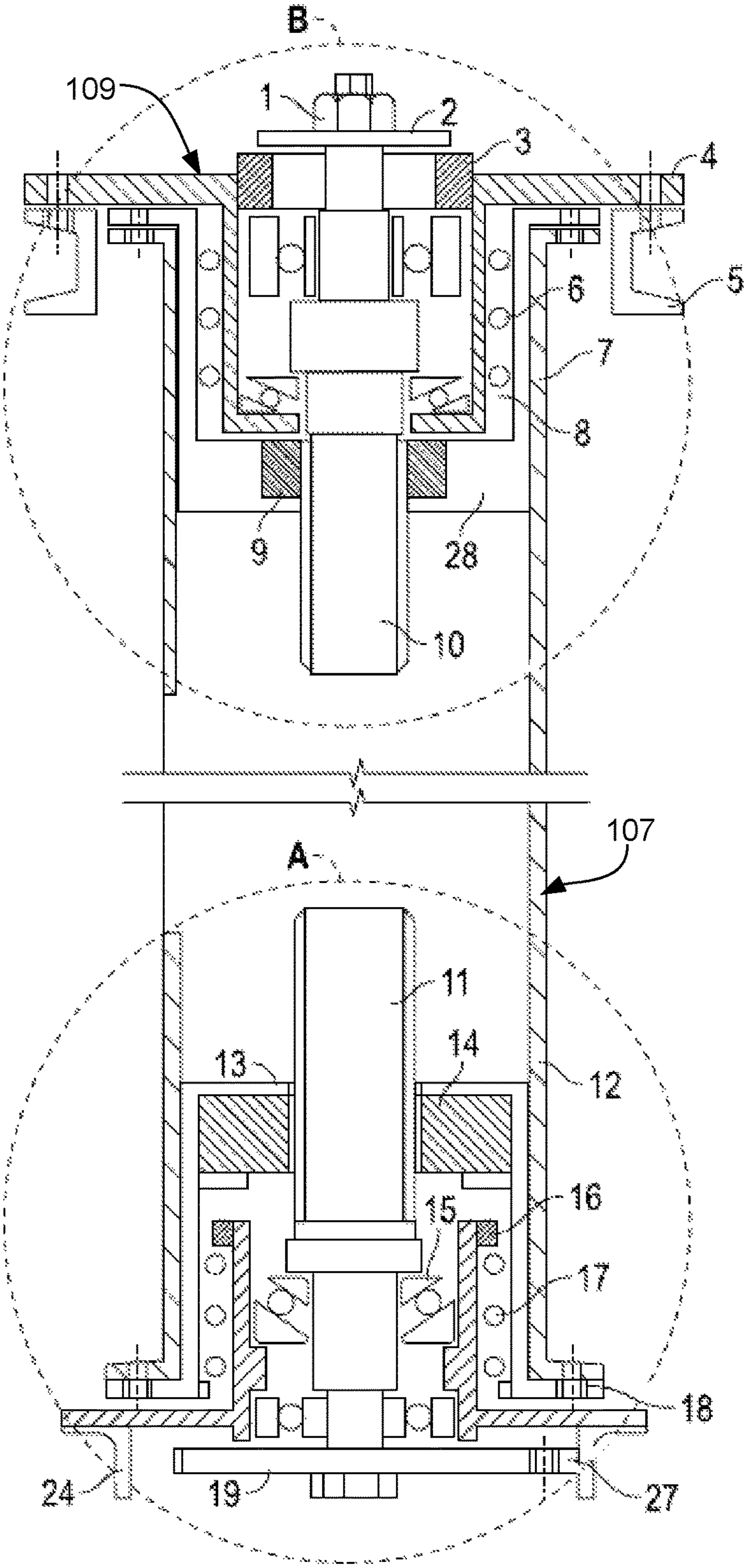
FIG. 2 are enlarged side section views of an upper and lower portion of the escalator system of FIG. 1.

Referring now also to FIG. 2 in the drawings, exploded views of the internal components within the central shaft 107 and fixed shaft 109 are illustrated. In particular, view B is used to illustrate the upper workings of shafts 107 and 109, while view A is used to illustrate the lower workings of shafts 107 and 109. An assortment of bearings, bushings, and other components are used to allow the central shaft 107 to translate and rotate relative to the fixed shaft 109. A table of sample components are as follows:

1. Fastening Nut
2. Spinning gear driven
3. Holding nut
4. Spinning housing
5. Upper motor frame
6. Spinning freedom bearings
7. Spinning trust bearing
8. Grease chamber
9. Spinning housing fastener
10. Spinning shaft
11. Leaner motion shaft
12. Central walking beam
13. Joint leaner shaft housing
14. Leaner main nut
15. Leaner trust bearing
16. Leaner housing
17. Leaner freedom bearing
18. Fastening aperture
19. Leaner driven gear
24. Leaner motion main frame
27. Leaner drive gear Central shaft 107 is configured to raise and lower along shaft 10 via at least bearings 6 and 17. Rotation of central shaft 107 is permitted via rotation of bearings in contact with shafts 10 and 11. Central shaft 107 is configured to move in relation to shaft 108. It is understood that central shaft 107 is configured to extend between the upper and lower portions of system 101. Stairs 103 are selectively attached to central shaft 103 and housing 21 as seen in FIG. 3.

Figure 3:
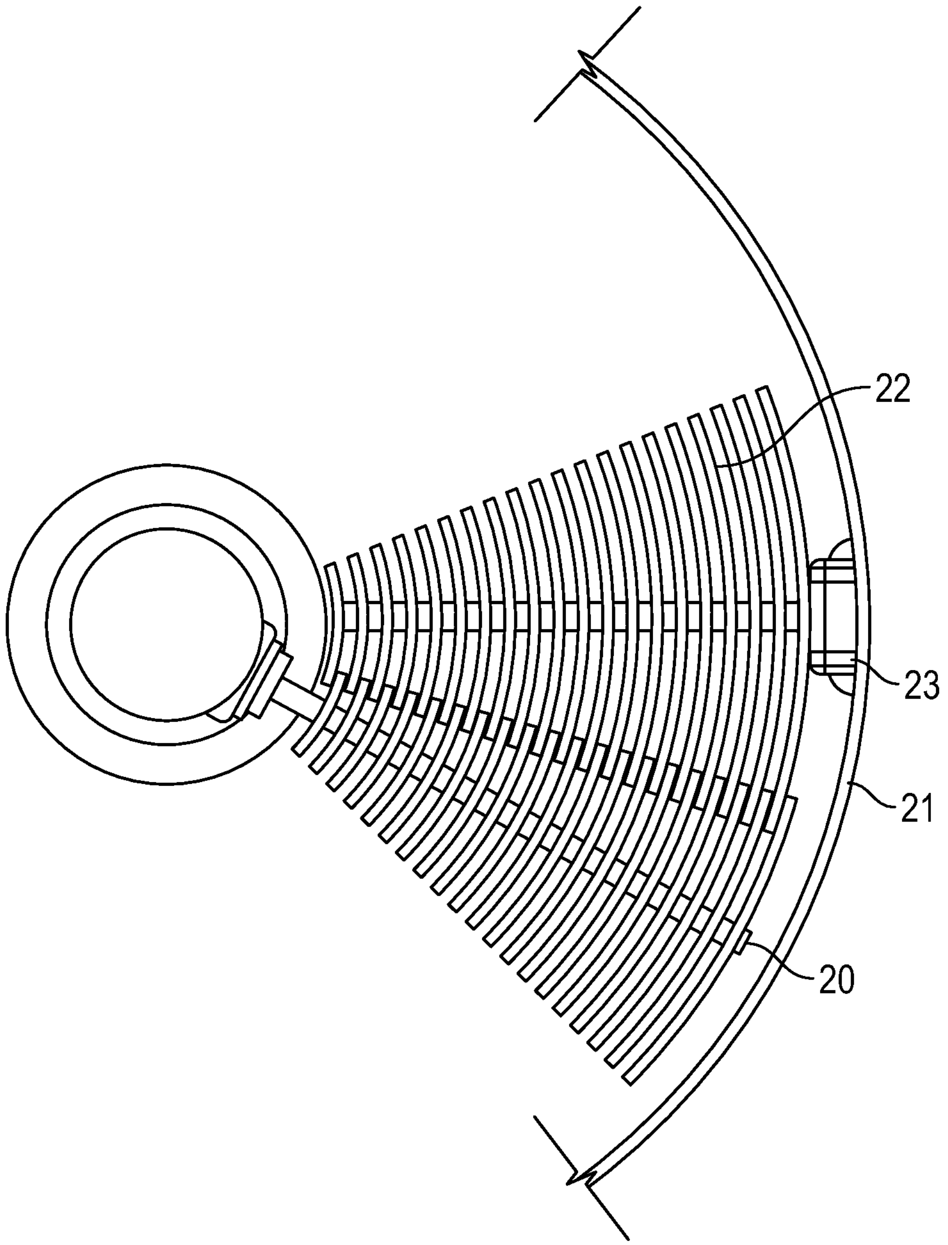
FIG. 3 is a top view of a fixed stair and a movable stair in a stairwell of the escalator system of FIG. 1.

Referring now also to FIG. 3 in the drawings, a top view of a portion of stairs 103 is illustrated. Stairs 103 incorporate both movable stairs 20 and fixed stairs 22. Stairs 103 are located within a stairwell defined as the space between housing 21 and central shaft 107. Movable stairs 20 are coupled to central shaft 107 and are configured to transport an individual between two fixed stairs 22. Fixed stairs 22 are coupled to housing 21 via a fixed stair plate 23 and are configured to support the individual between the movements of stair 20. Movable stair 20 is configured to loop around stair 22 to transport the individual to another fixed stair 22. The movement of movable stair 20 relative to fixed stair 22 is more clearly illustrated in FIG. 4 below.

Each stair 103 includes an elongated portion 41 that passes through a series of fins. Each fin is configured to couple to and extend away from the elongated portion. The fins 43 the movable stair 20 and the fins 45 of the fixed stair 22 are configured to engage each other by permitting the fins 43 to translate between fins 45. During movement of movable stair 20 relative to fixed stair 22, the fins 43 are configured to pass between fins 45 and around the elongated portion 41 of each fixed stair. Fixed stairs 22 are arrayed around housing 21 along the full height of system 101. A single movable stair 20 is operable between two fixed stairs 22.

Figure 4:
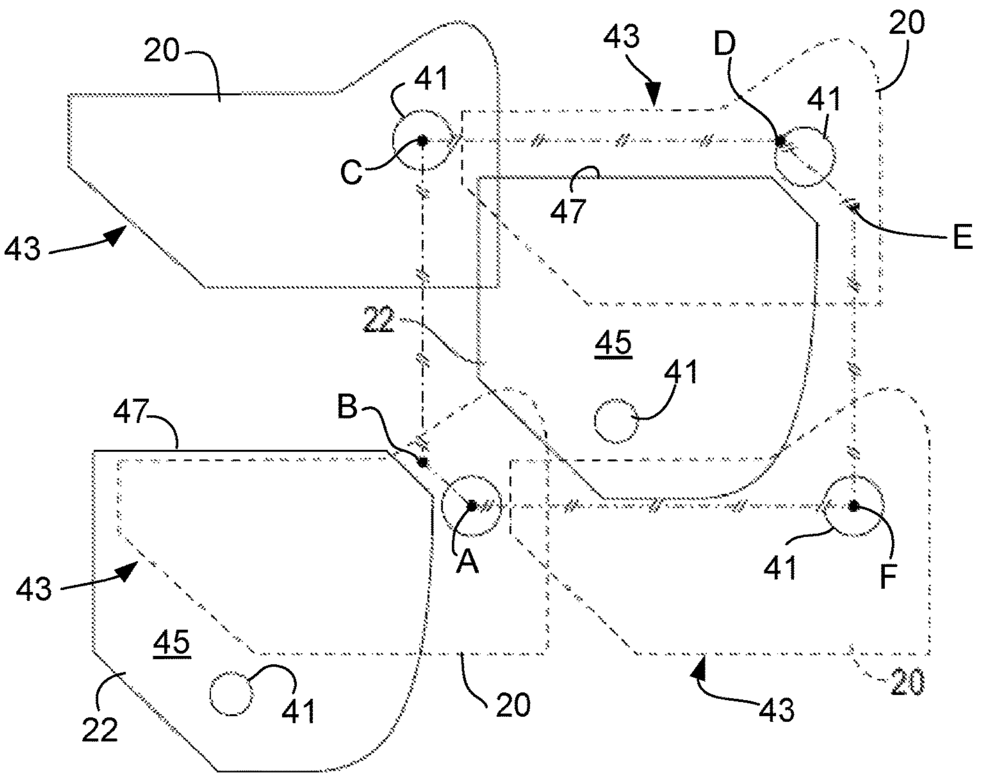
FIG. 4 is a diagram of the movement of the movable stair relative to a plurality of fixed stairs in the escalator system of FIG. 1.

Referring now also to FIG. 4 in the drawings, a diagram showing the movement of movable stair 20 relative to fixed stair 22 is illustrated. Movable stair 20 is configured to operate between a plurality of positions around fixed stair 22. These positions allow movable stair 20 the ability to locate itself below a top surface 47 of a single fixed stair, lift the individual to the height of the neighboring fixed stair 22 and gently place the individual on the top surface of the second fixed stair 22. While traversing through the plurality of positions, elongated portion 41 of stair 20 is configured to loop around elongated portion 41 of fixed stair 22. It is important to note that an individual is transported between the fixed stairs by separate individual movable stairs. In other words, a single track of stairs are not used to transport the individual. Each movable stair 20 is separate from adjacent movable stairs and from each fixed stair 20.

During operation, movable stairs 20 move in conjunction with the movement of central shaft 107. Central shaft 107 is configured to rise and fall, and rotate at a selected speed and in a particular pattern. This pattern coincides with the positions of movable stair 20 as seen in FIG. 4. Movable stair 20 operates between positions A-F. Position A is selected merely as a starting location for the purpose of explanation. At position A, movable stair 20 is located just below surface 47. Elongated portion 41 of stair 20 is behind fins 45. Stair 20 is then elevated and rotated to position B, fins 41 passing through fins 45. Fins 41 contact the individual so as to lift them off fins 45. Movable stair 20 then rises to position C, such that elongated portion 41 of stair 20 is above fins 45. In this position the top of stair 20 is above top surface 47 of the adjacent fixed stair 20. Movable stair 20 is then rotated to position D where the individual is brought over surface 47 of the adjacent stair 22. Elongated portion 41 of stair 20 passes over top surface 47. The individual is brought down into contact with the top surface 47 of step 22 as movable stair 20 is lowered and rotated into position E. Movable stair 20 is then moved into positions F and back to B to repeat the movements. Since there is a movable stair for each fixed stair, an individual sequentially moves from fixed step to fixed step going either upward or downward.

It is understood that the positions and movements of movable stair 20 may be reversed to accommodate the transportation of an individual downward from an elevated position. Also, the precise pattern of movements are not limiting. Other patterns may be realized. It is important that the elongated portions 41 of each step avoid contacting the fins 43, 45. Furthermore, it is seen that fins 43 and 45 are in continuous engagement as movable stair 20 passes around fixed stair 22.

An advantage of system 101 is the ability to transport an individual up and down between two different elevations without the use of a continuous track of steps as seen in conventional escalators. The use of the steps having a plurality of fins to selectively engage and move relative to one another allow the individual to be lifted and moved onto the adjacent step. Because the movable stairs are isolated to operating between no more than two fixed steps, a return loop for all stairs is not necessary from one elevation to the other elevation.

Figure 5:
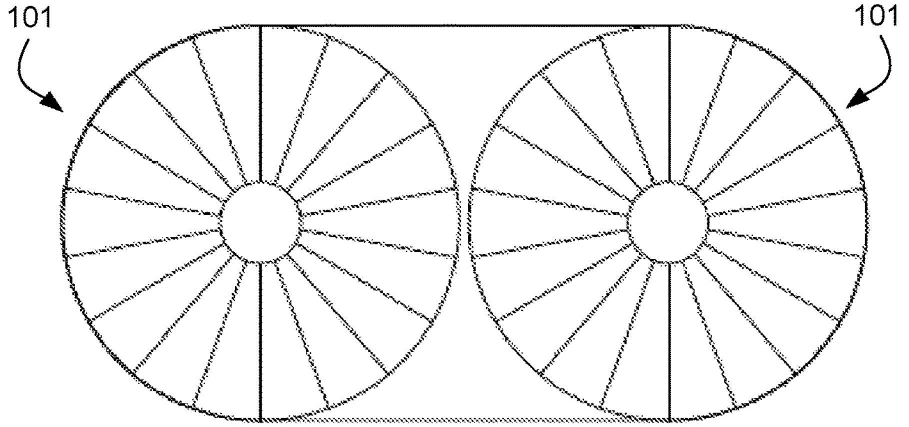
FIG. 5 is an exemplary top view of the escalator system of FIG. 1.
Figure 6:
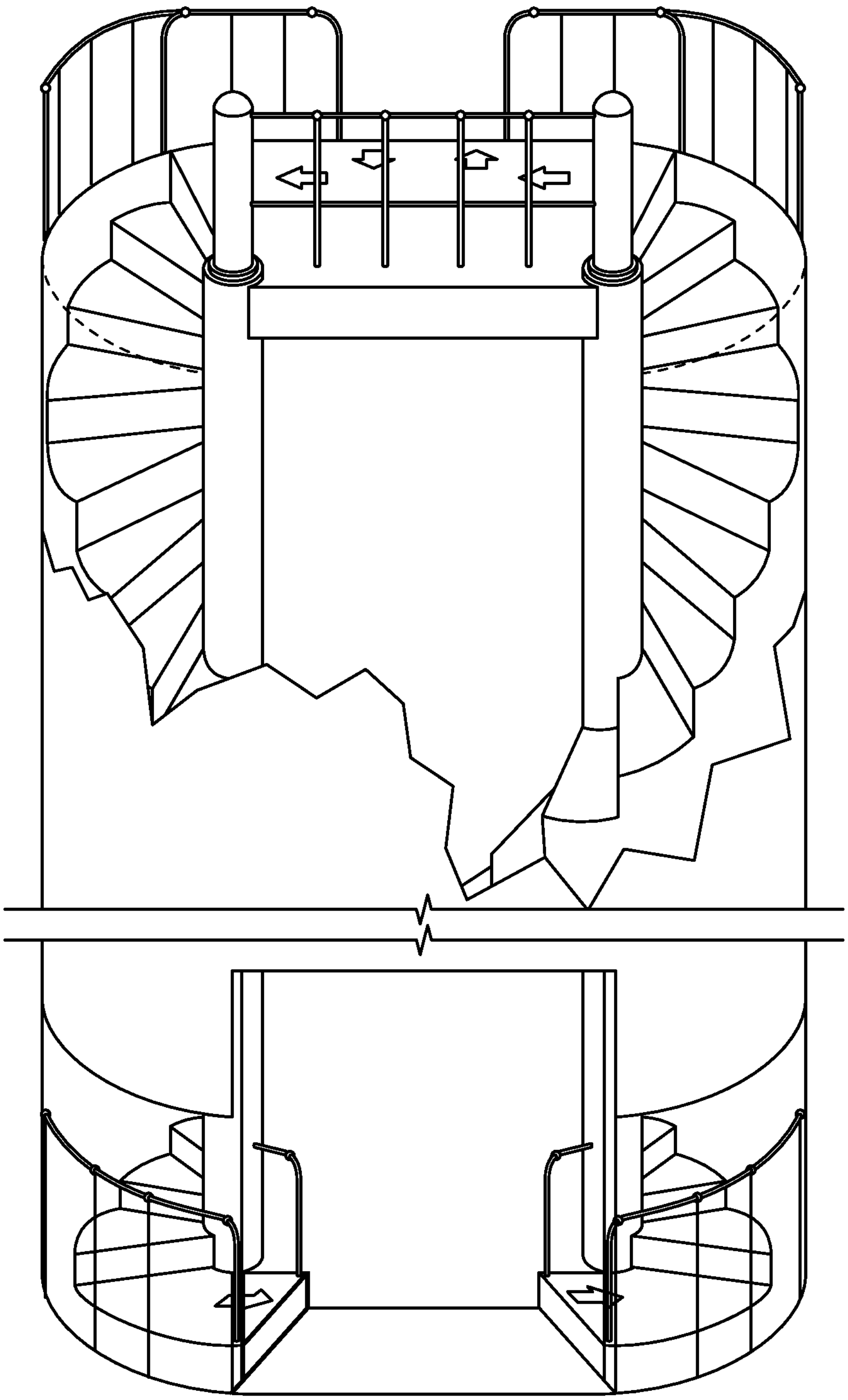
FIG. 6 is an exemplary perspective view of the escalator system of FIG. 1, having a plurality of landings and stairwells.

Referring now also to FIGS. 5 and 6 in the drawings, are exemplary embodiments of system 101 is illustrated. System 101 is also configured to be modular in that multiple systems may be located adjacent to one another. One may be operated to provide upward transportation and the other to provide downward transportation. In FIG. 5, two systems 101 are located side by side. In FIG. 6, a more detailed perspective view of two adjacent systems 101 are illustrated. It is seen that system 101 may further include landings 49 fixed in relation to the movement of stairs 20. Each landing 49 acts as a fixed platform for the entrance and/or exit of the individual at a selected elevation. The modular abilities of system 101 are further realized wherein system 101 may include multiple landings (i.e. three or more). In this configuration, system 101 may be stacked to accommodate three or more elevations.

During installation, shafts 107 and 109 are aligned and configured to move relative to one another. The stairs are coupled to the corresponding shaft 107 or housing 21. The movable stairs are configured and set to move around a portion of the fixed stair as the central shaft 107 moves. This movement can be set to permit the downward movement or upward movement of the individual. Fins on each stair allow them to provide a seamless transition of the individual between each fixed stair 22. The number of stairs 103 may be adjusted to compensate for the elevation difference The current application has many advantages over the prior art including at least the following: (1) a compact and modular circular stairway system; (2) seamless transition between fixed steps; (3) interlocking engagement of movable stairs to that of fixed stairs; and (4) stackability of the system to provide service to a plurality of elevations.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An escalator system for transporting an individual between different elevations, comprising:

a central shaft configured to raise, lower, and rotate relative to a fixed shaft;

a fixed stair coupled to an outer housing, the fixed stair including a plurality of fins, a stairwell defined between the fixed shaft and the outer housing; and a movable stair coupled to the central shaft, the movable stair configured to move in accordance to the central shaft, the movable stair including a plurality of fins, the fins of the movable stair and the fins of the fixed stair are configured to engage and pass between one another;

wherein the motion of the central shaft is configured to rotate the movable stair around the fixed stair; and wherein an individual is transported from the fixed stair to an adjacent fixed stair by the motion of the movable stair.

2. The escalator system of claim 1, further comprising:

a landing fixed in relation to the movable stair, the landing acting as a platform for the entrance or exit of the individual at the selected elevation.

3. The escalator system of claim 2, wherein a plurality of landings may be added along a series of fixed and movable stairs.

4. The escalator system of claim 1, wherein the moveable stair is configured to transport the individual between two fixed stairs.

5. The escalator system of claim 1, wherein the movable stair and the fixed stair remain in continuous engagement throughout the entire movement of the moveable stair.

6. The escalator system of claim 1, wherein the movement of the movable stair combines vertical movement with rotation.

7. The escalator system of claim 1, wherein both the fixed stair and the movable stair is cantilevered into the stairwell.

8. A method of transporting an individual between different elevations, comprising:

aligning a pair of shafts, a central shaft configured to raise, lower, and rotate relative to a fixed shaft, the central shaft configured to move in relation to the fixed shaft;

coupling a fixed stair to an outer housing, the fixed stair including a plurality of fins;

coupling a movable stair to the central shaft, the movable stair configured to move in accordance to the central shaft, the movable stair including a plurality of fins; and moving the movable stair around a portion of the fixed stair as the central shaft moves, the fins of the movable stair and the fins of the fixed stair are configured to engage and pass between one another;

wherein an individual is transported between fixed stairs by the motion of the movable stair.

9. The method of claim 8, further comprising:

adjusting the number of movable stairs and fixed stairs to accommodate the distance between the different elevations.

10. The method of claim 8, further comprising:

a landing fixed in relation to the movable stair, the landing acting as a platform for the entrance or exit of the individual at the selected elevation.

11. The method of claim 8, wherein the landing, movable stairs, and fixed stairs are modular to allow for a plurality of different elevations to be reached.

12. The method of claim 8, wherein the movable stair and the fixed stair remain in continuous engagement throughout the entire movement of the moveable stair.

13. The method of claim 8, wherein the movement of the movable stair combines vertical movement with rotation.

14. The method of claim 8, wherein the movement of the movable stair transports the individual from the top of a first fixed stair to the top of an adjacent fixed stair.

15. The method of claim 8, wherein both the fixed stair and the movable stair is cantilevered into a stairwell.

* * * * *